United States Patent
Lázaro Villa et al.

(10) Patent No.: US 6,925,231 B2
(45) Date of Patent: Aug. 2, 2005

(54) OPTICAL DEVICE FOR REDUCING TEMPERATURE RELATED SHIFT

(75) Inventors: José Antonio Lázaro Villa, Stuttgart (DE); Roland Münzner, Bissingen/Teck (DE)

(73) Assignee: Avanex Corporation, Fremont, CA (US)

( * ) Notice: Subject to any disclaimer, the term of this patent is extended or adjusted under 35 U.S.C. 154(b) by 13 days.

(21) Appl. No.: 10/434,064

(22) Filed: May 9, 2003

(65) Prior Publication Data

US 2003/0223690 A1 Dec. 4, 2003

(30) Foreign Application Priority Data

May 30, 2002 (EP) .............................. 02360158

(51) Int. Cl.$^7$ ................................. G02B 6/34
(52) U.S. Cl. ............................. 385/37; 385/31; 385/28; 385/15; 385/132
(58) Field of Search ............................... 385/14, 15, 37, 385/31, 28, 129, 132, 122

(56) References Cited

U.S. PATENT DOCUMENTS

| | | | |
|---|---|---|---|
| 6,137,939 A | 10/2000 | Henry et al. | |
| 6,256,442 B1 | 7/2001 | Nolan et al. | |
| 6,304,687 B1 | 10/2001 | Inoue et al. | |

(Continued)

FOREIGN PATENT DOCUMENTS

| | | |
|---|---|---|
| EP | 0 919 840 A1 | 6/1999 |
| EP | 1 072 908 A1 | 1/2001 |
| GB | 2 360 098 A1 | 9/2001 |
| WO | WO 02/1681 A1 | 2/2002 |

OTHER PUBLICATIONS

Kaneko A et al: "Athermal Silica–Based Arrayed–Waveguide grating (AWG) multi/demultiplexers with new loss groove design" Electronics Letters, IEE Stevenage, GB, vol. 36, No. 4, Feb. 17, 2000, pp. 318–319, XP006014828, ISSN: 0013–5194.

Kaneko et al: "Athermal silica–based arrayed–waveguide grating (AWG) multiplexers with new low loss groove design" OFC/IOOC '99. Optical Fiber Communication Conference and the International Conference on Integrated optic and Optical Fiber Communications (CAT. No. 99CH36322, OFC/IOOC '99 Optical Fiber Communication Conference and the International Conference on in, pp. 204–206, vol. 1, XP000966866, 1999, Piscataway, NJ, USA, IEEE, USA.

(Continued)

*Primary Examiner*—Fayez G. Assaf
(74) *Attorney, Agent, or Firm*—Moser, Patterson & Sheridan, L.L.P.

(57) ABSTRACT

The invention is an optical device having a plurality of optical waveguides and comprising at least one waveguide, which is defined by a core region having first and second sections that are series connected and are capable of transmitting light energy, the core region being surrounded by a cladding that essentially confines the light energy within the core region, the first section of the core region comprising a first length of material whose refractive index increases as temperature increases; the at least one waveguide is temperature-compensating in that and the second section of the core region comprises a second length of material whose refractive index has a sufficient enough difference of the rate of the variation of the index with the temperature, wherein the second section has a plurality of grooves, filled with the material whose refractive index has a sufficient enough difference of the rate of the variation of the index with the temperature, that are designed in a way the effective width of the second section changes between adjacent wave guides.

14 Claims, 3 Drawing Sheets

U.S. PATENT DOCUMENTS 6,690,855 B2 * 2/2004 Thompson et al. ............ 385/27
2004/0126052 A1 * 7/2004 Kamei et al. ................. 385/14

OTHER PUBLICATIONS

Inoue Y et al: "Athermal Silica–Based Arrayed Waveguide Grating (AWG) Multiplexer" IOOC–ECOC. European Conference on Optical Communication ECOC. International Conference on Integrated Optics and optical Fibre Communication IOOC, XX, XX, No. 448, Sep. 22, 1997, pp. 33–36, XP002058668.

Kokubun Y: "Athermal waveguides and temperature insensitive lightwave devices" Lasers and Electro–Optics, 1999. Cleo/Pacific Rim'99. The Pacific Rim Conference on Seoul, South Korea, Aug. 30–Sep. 3, 1999, Piscataway, NJ, USA, IEEE, US, Aug. 30, 1999, pp. 1143–1144, XP010364307.

Tanobe H et al: "Temperature insensitive arrayed waveguide gratings on InP substrates" IEEE Photonics Technology Letters, Feb. 1998, IEEE, USA, vol. 10, No. 2, pp. 235–237, XP000199330.

* cited by examiner

OPTICAL DEVICE FOR REDUCING TEMPERATURE RELATED SHIFT

BACKGROUND OF THE INVENTION

The invention is based on a priority application EP 02 360 158.6 which is hereby incorporated by reference.

Generally speaking, optical wavelength multiplexing and demultiplexing have been accomplished in the past by using an interconnection apparatus having a plurality of closely spaced input waveguides communicating with the input of a star coupler. The output of the star coupler communicates with an optical grating comprising a series of optical waveguides, each of the waveguides differing in length with respect to its nearest neighbor by a predetermined amount. The grating is connected to the input of a second star coupler, the outputs of which form the outputs of the switching, multiplexing, and demultiplexing apparatus.

The geometry of such an interconnection apparatus may be such that a plurality of separate and distinct wavelengths each launched into a separate and distinct input port of the apparatus will all combine and appear on a predetermined one of the output ports. In this manner, the apparatus performs a multiplexing function. The same apparatus may also perform a demultiplexing function. In this situation, an input wavelength is separated from the others and directed to a predetermined one of the output ports of the apparatus. An appropriate selection of input wavelength also permits switching between any selected input port to any selected output port.

Accordingly, these devices are generally referred to as frequency routing devices and more specifically wavelength division multiplexers (WDM).

Ideally, the operation of these AWG and WDM optical devices should by predictable and consistent over a wide range of environmental conditions. Unfortunately however, in practice, the operational performance of such devices is significantly affected by variations in the temperature of the environment surrounding the device.

More specifically, the wavelength spectrum of existing AWG designs shifts with temperature (T) for at least two reasons. First, where n represents the refractive index of the waveguide material, $dn/dT \neq 0$ and secondly, the thermal expansion, i.e. $dL/dT$, where L represents length, likewise does not equal zero.

To date, some of the techniques used to create optical devices that are less sensitive to temperature changes have included using a heater with a temperature controller to stabilize the wavelength spectrum of the AWG. Unfortunately, such a design is expensive and impractical in applications where electrical power is not readily available. In addition, the semiconductor art has demonstrated a temperature insensitive semiconductor WGR that includes a waveguide region with different dn/dT.

However, even in light of the technical advances mentioned above, there remains a definite need for a practical design and method for making optical waveguide filtering devices temperature independent. This is particularly true for compensating waveguide grating routers, which are, at present, the multiplexers of choice for dense WDM systems. Furthermore, given that silicon optical bench routers are now components of various Next Generation Lightwave Networks (NGLN) and are planned for use in Fiber-to-the-Home (FTTH) access networks, temperature-compensating optical devices like AWGs are highly desirable for these networks. In the U.S. Pat. No. 6,137,939 a design is proposed where a portion of the length of at least one waveguide within the optical device is modified in a way that stabilizes the wavelength spectrum passing therethough. The solution is to fill an elastomer material in either several blocks incorporated in the selected waveguides or to incorporate a wedge filled with the said elastomer material.

Also known are several designs of wedges from U.S. Pat. No. 6,304,687. All this proposed designs allow to adapt the WGR to different temperature with an acceptable insertion loss. But the known structures introduce a cross talk penalty in the WGR which disturbed the channels and mismatches the WGR for the several uses. To reduce the effects of cross talking between the waveguides it is known to use a design which separates the channels by implementing several separated wedges of same width of the material into the waveguides which has opposite temperature coefficient to the silica waveguide. The use of this wedges with different lengths but same width do not suppress the cross talk effects in a sufficient way.

SUMMARY OF THE INVENTION

The present invention relates to a temperature-compensating optical device with a design that allows the reduction of cross talk effect between adjacent waveguides.

A waveguide has a core region which is capable of transmitting light energy and is surrounded by a cladding that essentially confines the light energy within the core region. Additionally, a first section of the core region comprises a first length of material whose refractive index increases as temperature increases. In accordance with the present invention, a second section of the core region comprising a second length of material whose refractive index decreases as temperature increases.

In an illustrative embodiment of the present invention, an optical component having a plurality of waveguides includes at least one of the temperature-compensating waveguides in order to maintain its performance capabilities essentially independent of temperature. In a more specific illustrative embodiment, an optical device, such as a AWG, includes a first free space region having at least one input waveguide and a second free space region having at least one output waveguide.

Additionally, a plurality of unequal length waveguides connects the first free space region to the second free space region, wherein at least one of the unequal length waveguides is defined by a core region having first and second sections that are series connected and are capable of transmitting light energy, the core region being surrounded by a cladding that essentially confines the light energy within the core region, the first section of the core region comprising a first length of material whose refractive index increases as temperature increases. Most importantly, at least one of the unequal length waveguides is temperature-compensating in that the second section comprises a second length of material whose refractive index decreases as temperature increases or differs enough from the coefficient variation of the waveguide. A special design of the two said section allows the optimization of either cross talk and insertion losses.

The invention proposes a design with a plurality of grooves in the second section of core region where the grooves of a first embodiment differs from each other by their widths. The widths are designed in a pseudo-randomized way, so that no relation between the widths of adjacent wedges occurs. This allows an effective reduction of cross talk effect. In a further embodiment of the invention a plurality of grooves are formed as second section of the core region. The plurality of grooves allows the fine adaptation of the temperature behavior of the optical device or component. The plurality of wedges also allows decrease of the cross talk. Preferably the design to use several wedges parallel to each other has an advantage reduction of insertion loss penalty. Another preferred embodiment shows a plurality of trapezoids. The best results are obtained while following special design rules for the trapezoids.

BRIEF DESCRIPTION OF THE DRAWINGS

Embodiments of the inventions are shown in the figures and described in details in the description below.

FIG. 1 shows a circuit diagram of a conventional arrayed waveguide grating multiplexer. The input waveguides 2 are connected to a first slab waveguide 3 and via an FIG. 2 shows an arrayed waveguide with two sections: a first arrayed waveguide 4 and a second slab waveguide 5 to the output waveguides 6.

FIG. 2 shows a athermal arrayed waveguide as described in prior art. The arrayed waveguide 4 comprises two sections with a first section made by silica and a second section made of an elastomeric material with a negative thermal coefficient. In order that optical phases in two adjacent waveguides are varied with respect to temperature change it is necessary that the difference of optical path lengths of the two adjacent waveguides are not varied with respect to temperature. When the temperature coefficient of the refractive index of the first section of the waveguide and the temperature coefficient of the second section of the waveguide have different values a broad groove is formed in a long waveguide 4 and a small groove in a short waveguide. As the arrayed waveguide grating multiplexer needs to satisfy the condition between each adjacent pair of waveguides 5 grooves which are sequentially elongated at a constant length provided in accordance with the waveguides. Using another material for filling the grooves with a thermal coefficient which is not negative but differs in the variation of temperature from the material of the waveguide, the triangle structure must be rotated about the center by 180°.

The grooves does not have a waveguide structure and therefore optical strength distribution is spread due to diffraction a loss I generated. Therefore the width of the groove is smaller the loss is smaller. Also crass talk effects increase.

Examples for temperature compensating materials are aromatic compounds such as benzene and toluene, cyclic hydrocarbon compounds, linear hydro compounds, chloride, sulfide and ketone and a huge number of polymeric material.

Figure 1:
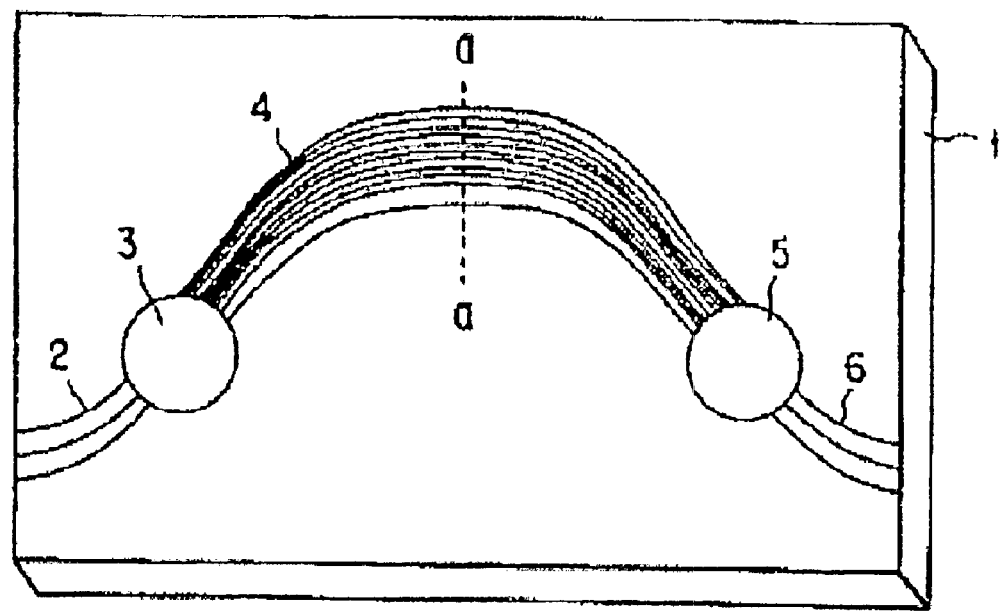
FIG. 1 shows a WGR device without temperature compensation
Figure 2:
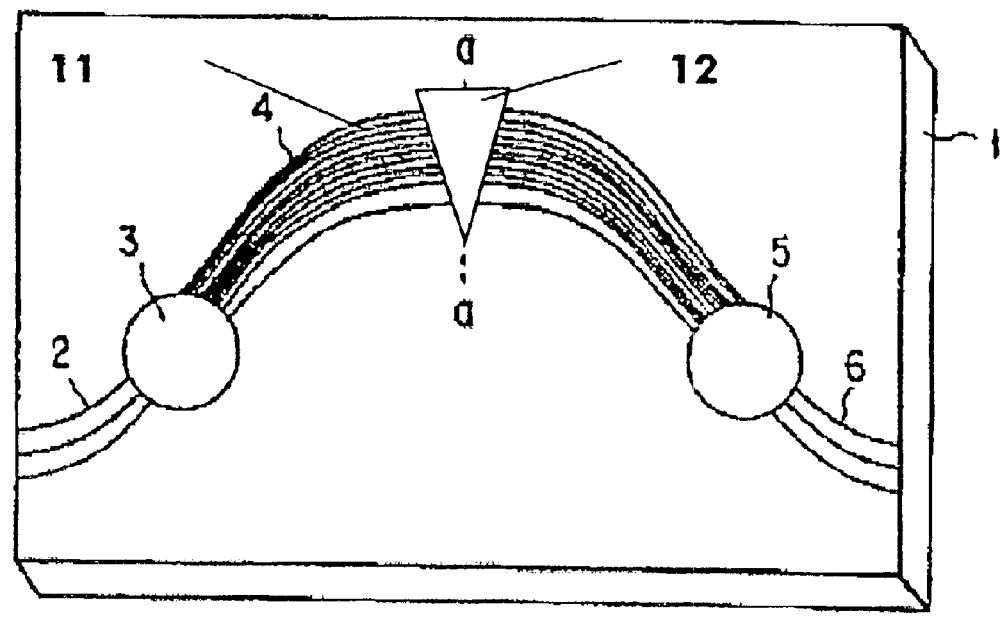
FIG. 2. shows a WGR device according prior art
Figure 3:
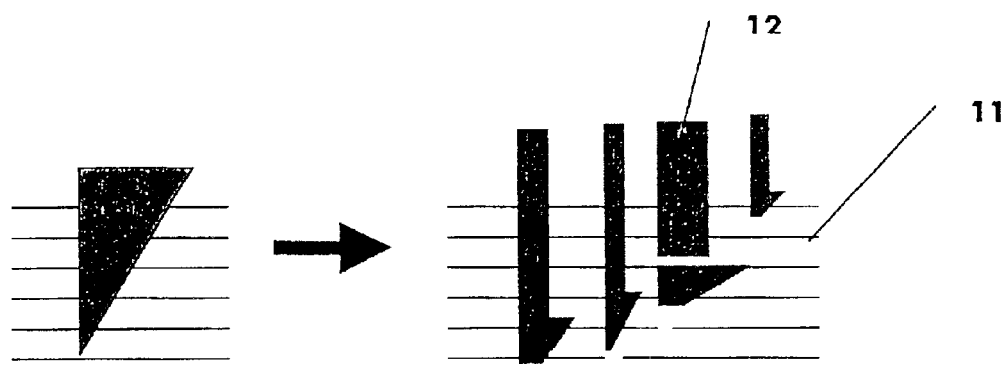
FIG. 3 shows a first embodiment of the invention

FIG. 3 shows a temperature independent structure of a waveguide device. The wedge of the prior art is dissolved in a group of structures with pseudo randomized widths W. The widths are designed to minimize loss and cross talk. Adjacent wedges structures have different widths without correction between the widths. The lengths of the wedges are different from each other. As a result the optical phase to two adjacent waveguide see different length of the material filled in the grooves.

The solution according FIG. 3 corresponds to a pseudo-randomization of the W parameter. The motivation is to distribute the energy of the side-lobes produced by the slot structure along a wider range of wavelengths in order to dismiss their impact on the crosstalk. Simulation has been done to check the result of pseudo randomization of the width W. In order to investigate this design, two pseudo-randomised structures have been considered. The minimum slot width is restricted by technology to 10 $\mu$m Due to that, a variation of the W parameter has to be done towards higher W parameter. The first structure uses slots with alternative widths of 15 and 20 $\mu$m with good results. Another design structure implements alternative slots with 15, 17.5 and 20 $\mu$m minimum width.

Figure 4:
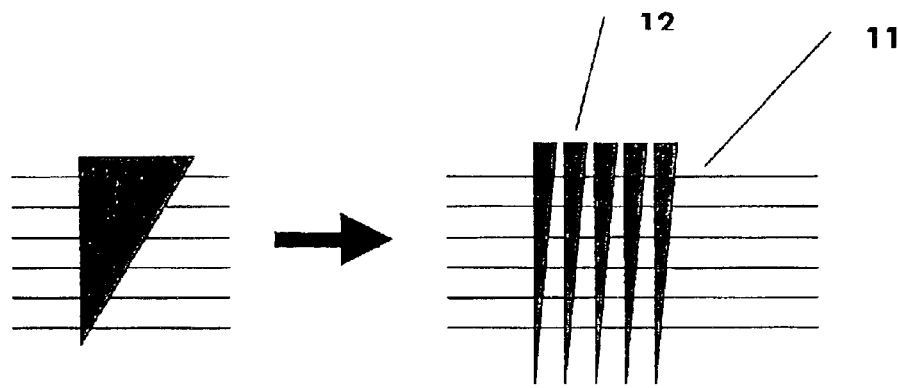
FIG. 4 shows a second embodiment.
Figure 5:
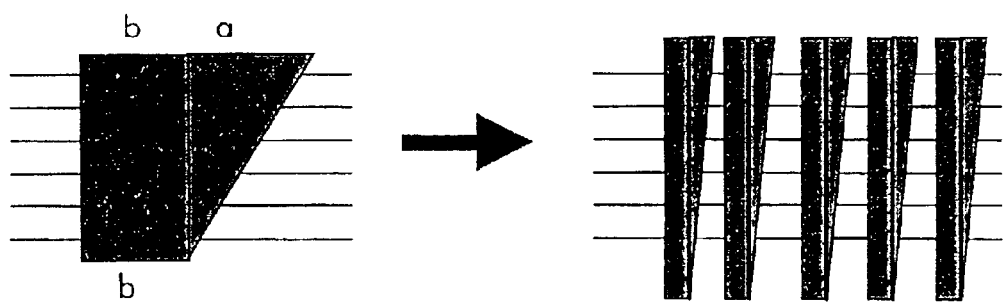
FIG. 5 shows a third embodiment of the invention.

FIG. 4 shows another embodiment of the invention. The wedges have the same length and they are arranged parallel to each other. This design also dissolves one triangular wedge in a plurality of wedges. In this approach a new segmentation of the polymer wedge is proposed. The original idea consist in a set of triangles as shown in FIG. 4. Nevertheless, a minimum slot width is imposed by technology. Due to that, the original polymer wedge must be transform in a trapezoidal figure, so that the segmentation can also be done in trapezoidal shape slots, according FIG. 5.

As a first case, a structure with trapezoidal slots with minimum and maximum width of 15 $\mu$m and 30 $\mu$m have been considered. It means that the whole polymer trench is also a trapezoid with b=a (a is determined by the TOC of the polymer and the $\Delta L$ of the AWG design. For the sample used for the study the two values are TOC=$-4 \times 10^{-4}$ and a=181 $\mu$m. ) The invention is not restricted to the "hard" definition of the trapezoid above with the values of these examples.

A second structure has been investigated with minimum and maximum width of the slots of 15 $\mu$m and 22.5 $\mu$m. It means that for this case, b=2×a. This two examples have different insertion losses and different crass talk reduction strengths. The design should be by using a trapezoid structure be adapted to the materials used and the technology for manufacturing the optical component.

Because the slots cross the whole AWG, the amplitude and phase distortion produce by this structure does not present the saw structure of FIG. 4.

There is no termination of the slots in the middle of the array of waveguides. The trapezoidal fragmentation imposes no restriction about a minimum distance between the waveguides of the arrayed as the standard structure.

A further improvement to dismiss the back reflection can be done by changing the angle between the waveguide and the slot from 90° to ~86°.

A method for producing the proposed designed waveguide of the invention will be described below:

Step 1: A quartz glass is accumulated on the Si substrate by flame-accumulating process, and is transparentized in an electric furnace.

Step 2: Then, a core glass in which Ge is added is accumulated on the glass film, which is accumulated in step 1 by flame-accumulating process, and is transparentized in the electric furnace.

Step 3: Then, the core glass is patterned by photolithography and reactive etching.

Step 4: Lastly, the quartz glass is accumulated, and is transparentized.

With this series of operations, an embedded quartz waveguide having a small propagation loss is produced.

After the waveguide is produced the shaped designed grooves 12 were formed in the straight waveguide portion 11 by photolithography and reactive etching. Each of these grooves 12 were formed by rotating a sample little by little and lap-cutting the grooves by the dicing saw. The grooves were formed according to the used design. A depth of the groove was ~50 μm. Lastly, a silicone resin was dropped into the grooves 12, heated and cured. The optical path length temperature coefficient of this silicone resin was about −40 times of that of a quartz waveguide, and was −4×10$^{-4}$.

What is claimed is:

1. An optical device having a plurality of optical waveguides and comparing at least one waveguide, which is defined by a core region having first and second sections that are series connected and are capable of transmitting light energy, the core region being surrounded by a cladding that essentially confines the light energy within the core region, the first section of the core region comprising a first length of material whose refractive index increases as temperature increases, wherein the at least one waveguide is temperature-compensating and the second section of the core region comprises a second length of material whose refractive index has a sufficient enough difference of the rate of the variation of the index with the temperature, wherein the second section has a plurality of grooves, filled with the material whose refractive index has a sufficient enough difference of the rate of the variation of the index with the temperature, that are designed in a way the effective width of the second section changes between adjacent wave-guides and where each groove of the second section has the shape of a triangle over its whole length, and the grooves of the second section have different pseudo randomize widths uniform along the lengths of the grooves.

2. The optical device of claim 1, wherein the second material has a temperature coefficient that decreases when the temperature increases.

3. The optical device of claim 1, wherein second material has a temperature coefficient which increases but with a rate of variation different from the temperature coefficient of the first material.

4. The optical device of claim 1, wherein the first section of the core region is made of silica.

5. An optical device having a plurality of optical waveguides and comparing at least one waveguide, which is defined by a core region having first and second sections that are series connected and are capable of transmitting light energy, the core region being surrounded by a cladding that essentially confines the light energy within the core region, the first section of the core region comprising a first length of material whose refractive index increases as temperature increases, wherein the at least one waveguide is temperature compensating and the second section of the core region comprises a second length of material whose refractive index has a sufficient enough difference of the rate of the variation of the index with the temperature, wherein the second section has a plurality of grooves, filled with the material whose refractive index has a sufficient enough difference of the rate of the variation of the index with the temperature, that are designed in a way the effective width of the second section changes between adjacent wave-guides and where each groove of the second section has the shape of a triangle over its whole length, and the grooves of the second section have non uniform widths along the lengths of the grooves but the same lengths.

6. The optical device of claim 5, wherein the second material has a temperature coefficient that decreases when the temperature increases.

7. The optical device of claim 5, wherein second material has a temperature coefficient which increases but with a rate of variation different from the temperature coefficient of the first material.

8. The optical device of claim 5, wherein the first section of the core region is made of silica.

9. An optical device having a plurality of optical waveguides and comparing at least one waveguide, which is defined by a core region having first and second sections that are series connected and are capable of transmitting light energy, the core region being surrounded by a cladding that essentially confines the light energy within the core region the first section of the core region comprising a first length of material whose refractive index increases as temperature increases, wherein the at least one waveguide is temperature-compensating and the second section of the core region comprises a second length of material whose refractive index has a sufficient enough difference of the rate of the variation of the index with the temperature, wherein the second section has a plurality of grooves, filled with the material whose refractive index has a sufficient enough difference of the rate of the variation of the index with the temperature, that are designed in a way the effective width of the second section changes between adjacent wave-guides and where each groove of the second section has the shape of a triangle over its whole length, each groove of the second section has the shape of a single trapezoid, and the trapezoids are created by the triangle with one side length a and by an attached rectangular shape with one side length b.

10. The optical device of claim 9, wherein the side length of each trapezoid follows the rule a=b.

11. The optical device of claim 9, wherein the side lengths of each trapezoid follows the rule b=2a.

12. The optical device of claim 9, wherein the second material has a temperature coefficient that decreases when the temperature increases.

13. The optical device of claim 9, wherein second material has a temperature coefficient which increases but with a rate of variation different from the temperature coefficient of the first material.

14. The optical device of claim 9, wherein the first section of the core region is made of silica.

* * * * *